(12) United States Patent
Hoffpauir

(10) Patent No.: US 9,374,391 B2
(45) Date of Patent: Jun. 21, 2016

(54) COMPOSITE ENDPOINT MECHANISM

(75) Inventor: Samuel S. Hoffpauir, Germantown, MD (US)

(73) Assignee: BroadSoft, Inc., Gaithersburg, MD (US)

( * ) Notice: Subject to any disclaimer, the term of this patent is extended or adjusted under 35 U.S.C. 154(b) by 264 days.

(21) Appl. No.: 12/268,708

(22) Filed: Nov. 11, 2008

(65) Prior Publication Data

US 2010/0121956 A1 May 13, 2010

(51) Int. Cl.
*G06F 15/16* (2006.01)
*H04L 29/06* (2006.01)

(52) U.S. Cl.
CPC ........ *H04L 65/1043* (2013.01); *H04L 65/1006* (2013.01); *H04L 65/1089* (2013.01)

(58) Field of Classification Search
CPC ............ H04L 65/1089; H04L 65/1006; H04L 65/1043
See application file for complete search history.

(56) References Cited

U.S. PATENT DOCUMENTS

| | | | |
|---|---|---|---|
| 6,574,331 B1 * | 6/2003 | Forsythe et al. | 379/265.01 |
| 6,721,412 B1 * | 4/2004 | Youngs | 379/204.01 |
| 6,807,529 B2 * | 10/2004 | Johnson et al. | 704/270.1 |
| 7,299,286 B2 * | 11/2007 | Ramsayer et al. | 709/228 |
| 7,680,816 B2 * | 3/2010 | Sharma | 707/781 |
| 2002/0147814 A1 * | 10/2002 | Kimchi et al. | 709/226 |
| 2003/0023730 A1 * | 1/2003 | Wengrovitz et al. | 709/227 |
| 2004/0117804 A1 * | 6/2004 | Scahill et al. | 719/320 |
| 2004/0125756 A1 * | 7/2004 | Lepore et al. | 370/261 |
| 2006/0152577 A1 * | 7/2006 | Hagendorf et al. | 348/14.01 |
| 2007/0115931 A1 * | 5/2007 | Anderson et al. | 370/352 |
| 2007/0133773 A1 * | 6/2007 | Da Palma et al. | 379/201.01 |
| 2007/0183402 A1 | 8/2007 | Bennett et al. | |
| 2008/0019290 A1 * | 1/2008 | Suzuki | 370/254 |
| 2009/0013035 A1 * | 1/2009 | Hosn et al. | 709/203 |

FOREIGN PATENT DOCUMENTS

WO WO-2007/019804 2/2007

OTHER PUBLICATIONS

Chen, M.-X. et al., "SSIP: Split a SIP Session Over Multiple Devices," Computer Standards & Interfaces, vol. 29, 2007, pp. 531-545.

* cited by examiner

*Primary Examiner* — Yves Dalencourt
(74) *Attorney, Agent, or Firm* — Venable LLP; Michael A. Sartori; Todd R. Farnsworth

(57) ABSTRACT

A multimedia call from an originating device is provided. At least one session may be created at an application server in response to receiving the multimedia call. An endpoint may be created within the session for communication between the originating device and the application server. The endpoint may be a composite endpoint for communication between the originating device and two or more terminating devices. The composite endpoint may be include two or more logical endpoints for communicating with and respectively associated with the two terminating devices. A portion or more of the multimedia call may be delivered from the application server to each of the terminating devices using the logical endpoint associated with each terminating device.

20 Claims, 6 Drawing Sheets

കന#COMPOSITE ENDPOINT MECHANISM

BACKGROUND

The invention relates to communication systems for providing multimedia services, such as, for example, audio and video services.

Software maintenance is difficult for conventional communication systems that provide multimedia services, because each multimedia service is typically independently embedded at the application level. When a new multimedia service is added to a conventional communication system, changes to existing software are often required, which may lower the quality and increase the time to market for the new multimedia service.

SUMMARY

One exemplary embodiment may be a method for providing a multimedia call from an originating device. At least one session may be created at an application server in response to receiving the multimedia call. An endpoint may be created within the session at the application server for communication between the originating device and the application server. The endpoint may be a composite endpoint for communication between the originating device and two or more terminating devices. The composite endpoint may include two or more logical endpoints for communicating with and respectively associated with the two terminating devices. A portion or more of the multimedia call may be delivered from the application server to each of the terminating devices using the logical endpoint associated with each terminating device. The terminating devices may be one or more audio and video terminating device and the multimedia call may be split at the application server into at audio only and video only streams using the composite endpoint and delivered to the devices using the logical endpoints. Service logic is provided for the session using a service profile associated with a user of the originating device.

Another exemplary embodiment may be a system for providing at least one multimedia service, including a storage device, a processor, and a communication interface. The storage device may hold a software instructions for a composite endpoint. The composite endpoint may include service logic for splitting one multimedia stream into at least two multimedia streams and two or more logical endpoints for communicating with at least two devices that receiving the least two multimedia streams. The processor may execute the instructions and is coupled to the storage device and the communication interface. The service logic may fork one or more multimedia stream to two or more devices or combine two or more multimedia streams. The composite endpoint may include a policy manager for providing one or more policies for the operation of the multimedia service. The devices may include a first device for receiving only the audio portion of the multimedia service and a second device for receiving only a video portion of the multimedia service. The system may include an application server, which includes one or more sessions for the multimedia service, which in turn includes service logic and the composite endpoint.

Yet another exemplary embodiment may be a computer-readable medium including instructions, which when executed by an application server may cause the application server to perform operations for a composite endpoint. The computer-readable medium may include instructions executable by the application server for receiving at least one multimedia data stream. The multimedia data stream may include audio data, video data or other data. The computer-readable medium may include instructions executable by the application server for generating at least two endpoints, which may specify a communications device. The computer-readable medium may include instructions executable by the application server for separately transmitting at least two of the audio, video or other data portions of the multimedia data stream, to communications devices associated with the at least two endpoints. The computer-readable medium may include instructions executable by the application server for determining based on a user profile whether two, or all of the audio data, the video, and the other data, and both the audio and video data, is transmitted to one of the endpoints. The computer-readable medium may include instructions executable by the application server for determining if the multimedia stream needs to be demultiplexed and if the multimedia stream needs to be demultiplexed, demultiplexing the multimedia stream.

Further features of the invention, as well as the structure and operation of various embodiments of the invention, are described in detail below with reference to the accompanying drawings.

BRIEF DESCRIPTION OF THE DRAWINGS

Embodiments will now be described in connection with the associated drawings, in which.

DETAILED DESCRIPTION OF THE EMBODIMENTS

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. A person skilled in the relevant art will recognize that other components and configurations may be used without parting from the spirit and scope of the embodiments. It is to be understood that each specific element includes all technical equivalents that operate in a similar manner to accomplish a similar purpose. The examples and embodiments described herein are non-limiting examples.

Exemplary embodiments may include systems and methods for providing multimedia services, such as video-add-on. For example, video add-on may be a call service that allows a user to receive a video call where the audio portion of the call may be provided on the user's primary line or extended line (e.g., desk phone, home phone, cell phone, etc.) and the video portion of the call may be provided on a software client running on a computing device, such as a personal computer (PC). The video add-on call service may allow the user to receive video calls even when the user does not have a physical (non-PC-based) device to handle the video portion of the call. When the user does not have a video phone, the user may use a regular phone for the audio portion of the call and a PC for the video portion of the call.

Figure 1:
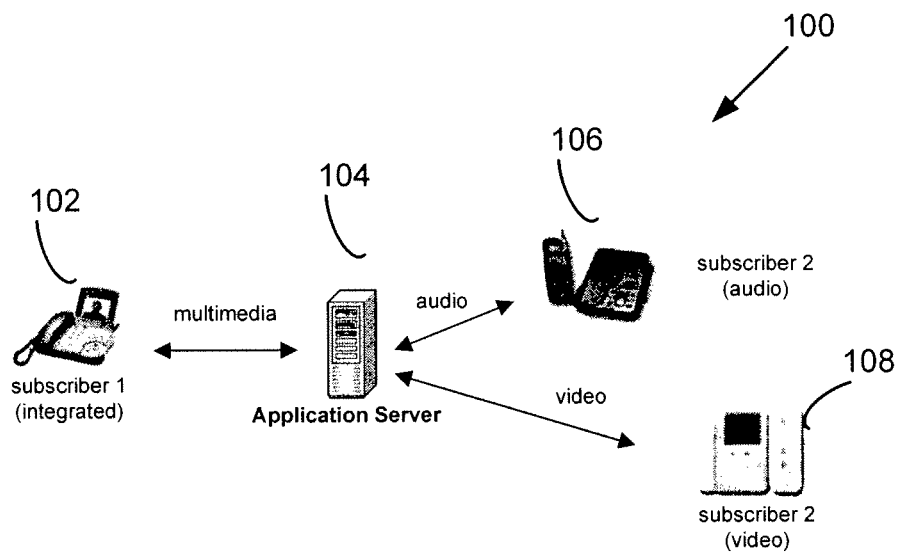
FIG. 1 depicts a multimedia video call, which is provided by an exemplary embodiment of a system for providing a multimedia service using a composite endpoint.

FIG. 1 depicts a multimedia call 100, such as a video add-on call, which is provided by an exemplary embodiment of a system for providing a multimedia service using a composite endpoint. The multimedia call 100 may be originated by a first subscriber on an integrated video phone 102 and received by an application server 104. The first and second subscribers (users) may subscribe to a multimedia video call service or some other multimedia service(s) or otherwise be users of a communications system. In this example, the application server 104 may include a video add-on service that provides the audio portion of the call on a regular phone 106 and the video portion of the call on a video phone 108 or a monitor or screen of a computer.

The application server 104 may be any combination of hardware, firmware and/or hardware running software for serving software applications providing multiple stream multimedia services. The application server 104 may include a memory or storage device, a processor coupled to the storage device, and a communication interface coupled to the processor. The memory or storage device may hold instructions that provide multiple stream multimedia services and the processor may execute the instructions. For example, the instructions may include a multimedia splitting component for splitting one multimedia stream into at least two multimedia streams, a multimedia aggregating component for combining at least two multimedia streams into one multimedia stream, and/or a policy management component for providing one or more policies for the operation of the multimedia services. The application server 104 may make a program interface for a multimedia service accessible to clients, such as other programs or devices. For example, the application server 104 may be a server that hosts an application programming interface (API) to expose logic, processes and other objects for use by, for example, another application, a Java application server, or a client residing on a device, such as integrated video phone 102.

Figure 2:
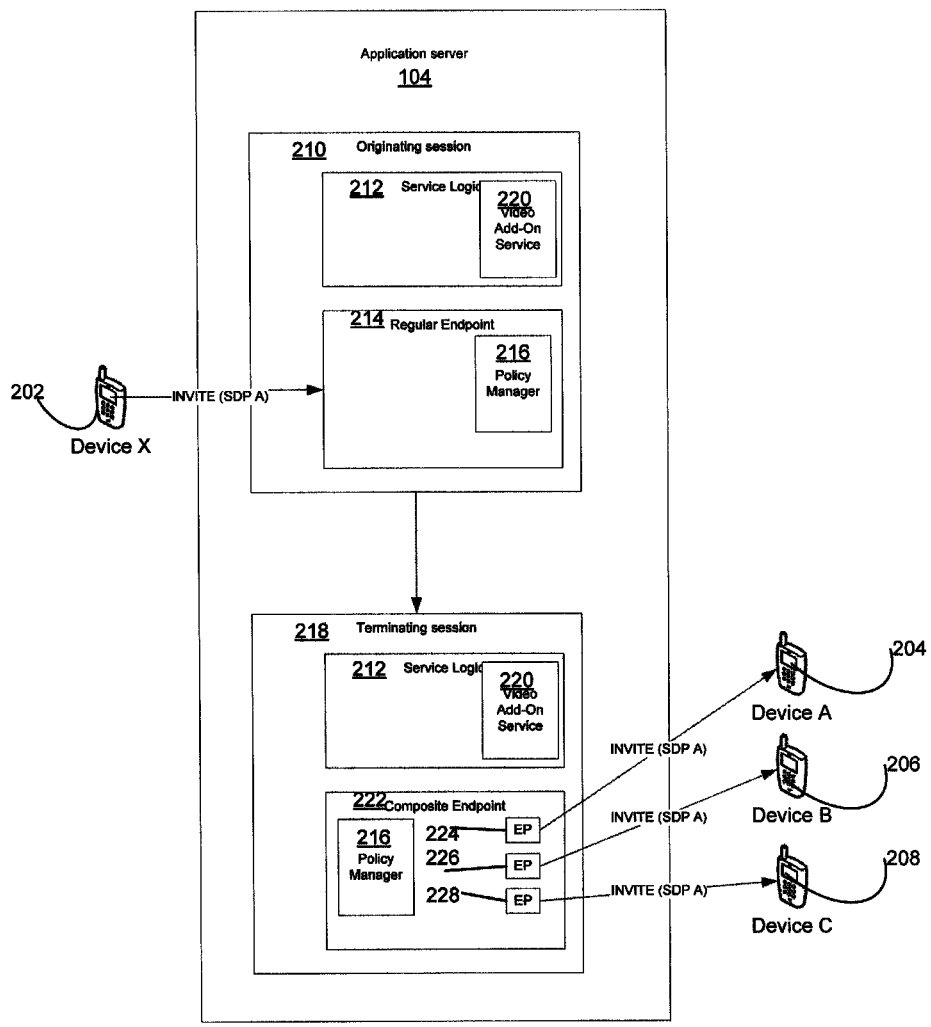
FIG. 2 depicts the system for providing a multimedia service using a composite endpoint of FIG. 1 in more detail for a multimedia call from one device that is split over three devices.

FIG. 2 depicts the exemplary system for providing a multimedia call using a composite endpoint of FIG. 1 in more detail for a multimedia video call from device X 202 and split over three devices, namely device A 204, device B 206, and device C 208. The application server 104 may detect the multimedia call for the called party's (i.e., the second subscriber's) originating session 210.

An originating session 210 may be a session established after the application server 104 receives an invitation or a call. A calling party may be associated with the originating session 210 in the application server. The originating session 210 may include service logic 212 and a regular endpoint 214. The regular endpoint 214 may be associated with the originating session 210 within the application server 104 and may be instantiated with, for example, a video add-on policy, which may be stored in a policy manager 216. The originating session 210 may be linked to a terminating session 218.

The terminating session 218 may be a session established after the application server 104 sends an invitation to one or more terminating device 204, 206, 208. A called party may be associated with the terminating session 218 in the application server 104. The application server 104 may deliver an invitation to service logic 212 in the terminating session 218. The service logic 212 may be derived from subscription information in the user profile. In this example, the user may be subscribed to a video add-on service 222, which may become part of the service logic 212 in the terminating session 218. As a result, a composite endpoint 222 may be created and the service logic 212 may be programmed into the composite endpoint 222. The invitation event may be processed through the service logic 212 in the terminating session 218 and delivered to the composite endpoint 222. The composite endpoint 222 may run instructions in the policy manager 216 and create an endpoint 224 for a communication session to an audio device 204 and another endpoint 226 for a communication session to a video device 206 and optionally another endpoint 228 for a communication session to a third device 208. The composite endpoint 222 may take the incoming invitation and split the media according to policies in the policy manager 216.

The composite endpoint 222 may manage the independent calls for each media type on one or more various kinds of devices 204, 206, 208, and may provide a single interface for service execution within the terminating session 218. The logical endpoints 224, 226, 228 may process the independent calls for each media type on the devices 204, 206, 208. The service logic 212 may include a video add-on service 220.

The devices interacting with the application server 104, such as, for example, device X 202, device A 204, device B 206, and device C 208, may be any kind of communications device, such as, for example, a voice over Internet Protocol (VOIP) device, which may support Session Initiation Protocol (SIP), Media Gateway Control Protocol (MGCP) or other protocol for placing and/or receiving multimedia calls. The devices 202, 204, 206, 208 may communicate with the application server 104 (e.g., via an SIP INVITE method) to place or receive calls. The devices 202, 204, 206, 208 may support audio only streams, video only streams, both audio and video streams, and/or any other kind of session-based media (e.g., instant messaging, text, file transfer, etc.).

The originating session 210, terminating session 218, service logic 212, video add-on service 220, regular endpoint 214, composite endpoint 222, logical endpoints 224, 226, 228, and policy manager 216 may be software entities having instructions that reside in a storage device and execute on a processor in the application server 104 that generally transform input into output between or among various communication devices by providing various multimedia services.

The originating session 210 and/or terminating session 218 may encapsulate all of the service logic 212 and communication protocol state machines needed to process a call for a given user. The originating session 210 and terminating session 218 may include the service logic 212 and state machine to process the call and one or more logical endpoints 224, 226, 228 to encapsulate the protocol state machine to deliver the call to a device, such as device A 204, device B 206, or device C 208.

The service logic 212 in the originating session 210 and/or terminating session 218 may include the state machine, service profile, and service policies needed to process the call from a device, such as device X 202, for a specific called user. The service logic 212 in the originating session 210 may differ from the service logic 212 in the terminating session or it may be the same, depending on the profile of the subscriber. The service logic 212 may be the container of the service subscription data and may manage the interactions for all of the services involved for the call for the specific user. The service logic 212 may include logic for one or more specific services, such as, for example, video add-on service 220.

The logical endpoints 224, 226, 228 and the composite endpoint 222 are specific examples of endpoints. These endpoints 224, 226, 228 may be logical components within the terminating session 218 that may encapsulate the protocol state machine for a communication stream with a device using a protocol such as, for example, SIP and MGCP for VOIP. Each endpoint 224, 226, 228 may provide an API for the service logic 212 to handle a received call or to initiate a call with a device (e.g., device X 202). Each endpoint 222, 224, 226, 228 may abstract the protocol from the service logic 212 via the API, allowing a protocol-independent service set, which may be used across multiple protocols and interwork calls between protocols.

The composite endpoint 222 may aggregate multiple communication sessions into a single logical endpoint container. This aggregation may avoid needing to change the service logic when new policies are deployed. The composite endpoint 222 may ensure that service interactions are transparent to the video add-on service 220 and that voice services continue to operate without change on the audio portions of the call. The composite endpoint 222 may provide splitting, forking or distributing services for multimedia streams. For the video add-on service 220, the composite endpoint 222 may provide one or more policies for splitting an incoming multimedia video call into an audio stream and a video stream and directing the audio stream to a regular phone, (e.g., the user's primary or extended line) and directing the video portion to the user's video client (e.g., the user's PC). The composite endpoint 222 may aggregate multiple media streams into a single terminating session 218 and may provides policies stored in the policy manager 216 that define, for example, on how the streams are processed and interact with each other.

The composite endpoint 222 may aggregate multiple multimedia streams with programmable policies to provide a variety of service offerings. The composite endpoint 222 may abstract the multiple multimedia streams from the service or application software layer of a communications system, allowing integration of multiple multimedia stream applications into existing services.

The composite endpoint 222 may be a special type of endpoint. The composite endpoint 222 may implement the same API as a regular endpoint; however, the composite endpoint 222 includes zero or more regular endpoints. The composite endpoint 222 may include its own policy logic, which may be populated via the user's service profile and stored in the policy manager 216. The composite endpoint 222 may instantiate an endpoint (e.g., composite endpoint 222 or logical endpoint 224, 226, 228) per communication stream as specified by the user's service profile. The service logic 212 may delegate calls among the logical endpoints 224, 226, 228 to the composite endpoint 222 for management. The programmable policies of the composite endpoint 222 may be defined and implemented when the service is developed. The logic for the composite endpoint 222 may be created as part of the service development and loaded into the composite endpoint 222 at execution time when the composite endpoint is instantiated.

The composite endpoint 222 may be instantiated during the call setup based on a service profile of a subscriber. The behavior of the composite endpoint 222 depends on the service profile assigned for the subscriber and the corresponding programmable policies used to provide the applicable services. The composite endpoint 222 may provide a variety of multiple stream multimedia services for a given user session. Examples of such services may include a video add-on service 220, a shared call appearance service, a multiple call arrangement service, a backup devices for remote survivability service, a dual-mode device support service for wireless networks (e.g., Wi-Fi) or global system for mobile communications (GSM) networks, and other services.

The video add-on service 220 may be a service that separates the audio and video stream for a given terminating session 218 so that the audio is only provided to the user's primary line phone and the video is only provided to the PC video client. The video add-on service 220 may be a call service that allows a user to receive a video call where the audio portion of the call is provided on the user's primary line or extended line (e.g., desk phone; home phone, call phone, etc.) and the video portion of the call is provided on a software client running on a computing device, such as a personal computer (PC). The video add-on service 220 may allow the user to receive video calls even when the user does not have a physical (non-PC-based) device to handle the video portion of the call. When the user does not have a video phone, the user may use a regular phone for the audio portion of the call and a PC for the video portion of the call. This may provide a more natural user experience, while adding video to the user's call experience.

A shared call appearance service may be used in various scenarios, such as, for example, key system emulation, executive/administrative assistant scenarios, and personal use. The shared call appearance service allows an incoming call to appear at multiple locations simultaneously. Any of a number of devices 202, 204, 206, 208 in a group where call appearance is shared may be used to answer an incoming call or to originate a call on behalf of the main location, such as in the executive/administrative assistant scenario. Only one device 202, 204, 206, 208 in the group where call appearance is shared may be involved in a call at any given time. The composite endpoint 222 may provide the forking policies and service abstraction to provide this service without any interface changes to other service applications by providing the appearance of a single endpoint to the other service applications.

The multiple call arrangement service may be an extension to the shared call appearance service. This service may allow multiple calls to be handled concurrently on different shared call appearance locations for a user. Because no single shared call appearance location may be considered the active location, all locations may be allowed to originate and receive calls when they have an available call appearance, regardless of the activity at the other locations. The composite endpoint 222 may provide an additional policy for the multiple call arrangement service, allowing multiple devices 202, 204, 206, 208 to be involved in calls simultaneously.

The backup devices for remote survivability service may be a service that allows a secondary (or backup) device to be contacted when the primary device is non-responsive or otherwise unreachable. The composite endpoint 222 may provide this capability by encapsulating the secondary device within the composite endpoint 222 and providing the policy to contact the secondary device when the primary device is deemed unreachable.

The dual-mode device support service for Wi-Fi/GSM networks may allow a user to be reached on the user's dual-mode phone on a Wi-Fi network when the user is connected to the Wi-Fi or GSM network. Similar to the backup devices for remote survivability service, the composite endpoint 222 may provide the abstraction of the location of the user from the service logic 212 and connect to the appropriate device 202, 204, 206, 208 based on a policy in the policy manager 216 that includes the user's network registration (e.g., Wi-Fi or GSM network).

The composite endpoint 222 may include several attributes, such as an encapsulation attribute, a service abstraction attribute, and a policy management attribute.

The encapsulation attribute may allow the composite endpoint 222 to encapsulate multiple multimedia streams in a single terminating session 218, providing the appearance of a single multimedia stream. The composite endpoint 222 may minimize or eliminate service interactions by abstracting media streams into a single instance of the composite endpoint 222 via the programmable policies stored in the policy manager 216. The terminating session 218 may be a software entity that embodies the encapsulation attribute of the composite endpoint 222.

The service abstraction attribute may allow the composite endpoint 222 to integrate multiple multimedia streams into the service logic 212 so that the service logic 212 is only aware of a single media session and may provide an API to a service layer that is identical to a single multimedia session API. The composite endpoint 222 may provide service abstraction by emulating a single endpoint (i.e., a composite endpoint 222), regardless of how many physical endpoints 224, 226, 228 are used in the multimedia service processing. The service logic 212 may be a software entity that embodies the service abstraction attribute of the composite endpoint 222.

The policy management attribute may allow the composite endpoint 222 to have programmable policies for various services. Some examples of programmable policies may include multiplexing or demultiplexing multiple multimedia streams into a single session 212. The policy management attribute may provide a programmable policy framework to control interactions among multiple multimedia sessions, which are encapsulated within the composite endpoint 222. Policies may define interactions among multiple multimedia streams. An extensible policy framework may allow dynamic instantiation of new policies as new services are instantiated. The policy manager 216 may be a software entity that embodies the policy management attribute of the composite endpoint 222.

In an exemplary operation, the application server 104 may receive a request to establish the call from a device, such as device X 202. The request may be a multiple SIP INVITE method, as defined in the Internet Engineering Task Force (IETF) draft standard, Request for Comments (RFC) 3261, or some other request using some other protocol. The application server 104 may identify the user associated with device X 202 via an INVITE method, which may be used to setup the call, and determine whether the call is an origination or termination in order to invoke an appropriate service set. The application server 104 then may create an originating session 210 or a terminating session 218 to process the call. As part of creating the originating session 210 or terminating session 218, the application server 104 may populate the originating session 210 or terminating session 218 with the appropriate service logic 212 as specified by a service configuration in a service profile for the user. The service profile may include a number of services, some of which may include a composite endpoint 222.

In this exemplary operation, the service profile of the terminating session 218 may include a forking service to deliver the media stream from the device X 202 to multiple devices 204, 206, 208. The service providing the forking capability may instantiate a composite endpoint 222. The programmable policy for the forking service may be populated in the composite endpoint 222 based on the service profile for the user when the composite endpoint 222 is instantiated and may be stored in the policy manager 216. The composite endpoint 222 may receive a call termination attempt, create a logical endpoint 224, 226, 228 for each device 204, 206, 208 as specified in the service profile, and/or deliver the call to each device 204, 206, 208. The composite endpoint 222 may implement the service API of a single endpoint, allowing the forking service to be integrated into the application server 104 without introducing any service interactions for the forking service. The logical endpoints 224, 226, 228 manage the communication of the media streams to each associated device 204, 206, 208.

Alternatively, a composite endpoint 222 may be instantiated in place of a standard logical endpoint 224, 226, 228 based on any services in the user profile that need the capabilities of a composite endpoint 222. The call may then be processed within the terminating session 218 via the populated service logic 212 and delivered to the logical endpoint 224, 226, 228. The composite endpoint 222 may act as the logical endpoint and provide the appropriate policies, which may be programmed into the composite endpoint 222 upon instantiation, based on the user's service profile. The composite endpoint 222 may create logical endpoints 224, 226, 228 for each communication stream needed for the service and manage the logical endpoints 224, 226, 228 based on the service policy. Thus, service interactions may be reduced, and a new multimedia service may be delivered by adding a new programmable policy, without any other modification to the existing application.

Figure 3:
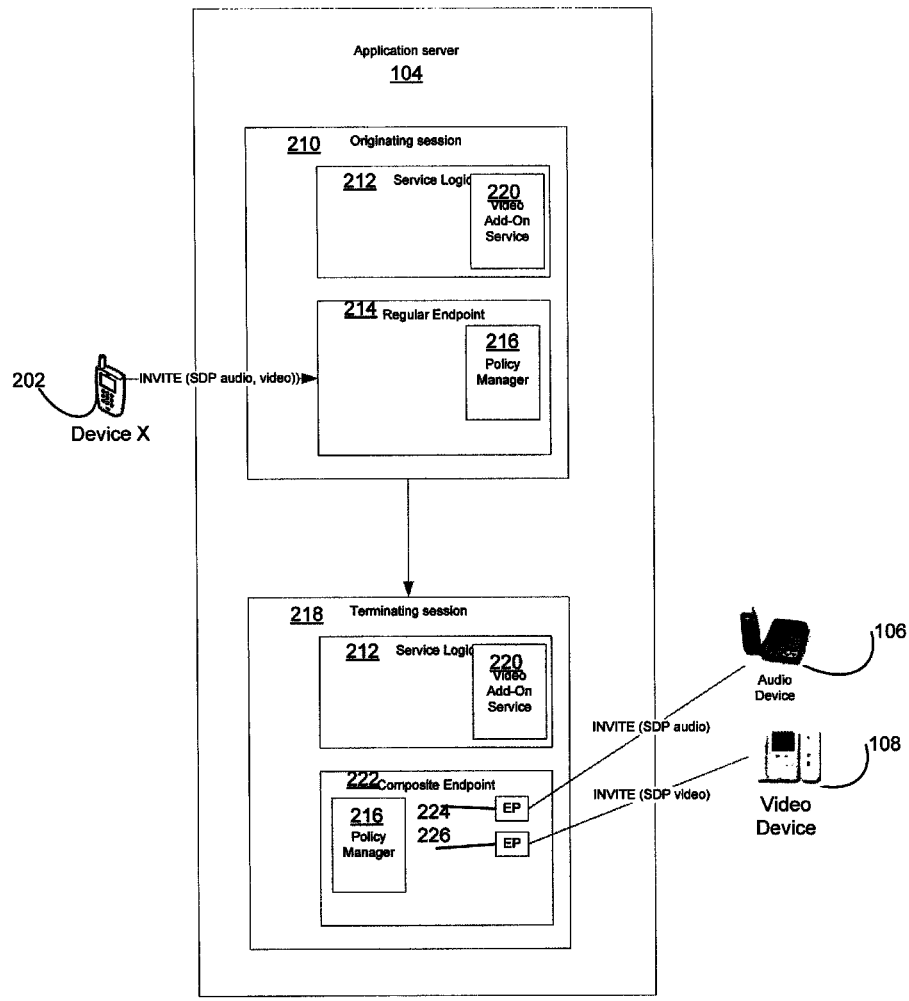
FIG. 3 depicts an exemplary embodiment of a system for providing a video add-on service using the composite endpoint.

FIG. 3 depicts an exemplary embodiment of a system for providing a video add-on service 220 for a call using a composite endpoint 222. The system processes the call from the device X 202 as follows. The application server 104 may receive the call from the device X 202 and may identify the user associated with the device X 202 via the INVITE method used to setup the call. Then, the application server 104 may create the originating session 210 to process the call and populate the originating session 210 with the service profile for the user associated with device X 202. The service profile may include a number of services, some of which may involve the composite endpoint 222. After the originating session processing completes, the application server may create a terminating session 218 to process the call and populate the terminating session 218 with the service profile for the user associated with the audio device 106 and the video device 108. The service profile may include a number of services, some of which may involve the composite endpoint 222. The service profile may include a video add-on service 220, which runs on the terminating session 218 to split the media stream received from device X 202 into an audio media stream and a video media stream. The service providing the video add-on service 220 may instantiate the composite endpoint 222. The composite endpoint 222 may include logical endpoints 224, 226 to manage the communication of the media streams to the audio device 106 and the video device 108. The audio device 106 may be any device capable of receiving an audio media stream, such as a cell phone and the video device 108 may be any device capable of receiving a video media stream, such as a video phone or PC. The composite endpoint 222 may implement the service API of a single endpoint, allowing the video add-on service to be integrated into the application server 104 without introducing any service interactions for the video add-on service.

Figure 4:
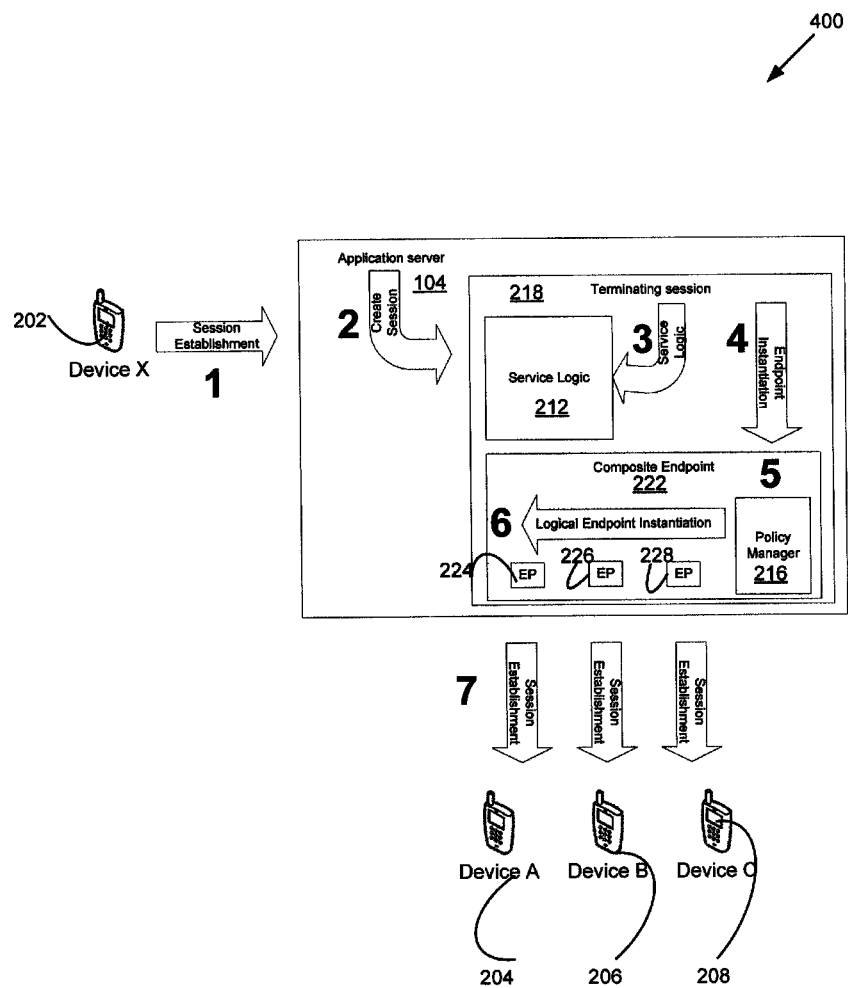
FIG. 4 depicts an exemplary embodiment of a method for providing a multimedia service using the composite endpoint.

FIG. 4 depicts an exemplary embodiment of a method 400 for providing a multimedia service using the composite endpoint 222. FIG. 4 shows the composite endpoint's 222 role within the terminating session 218 and the composite endpoint's 222 interactions with other components in the flow of processing session events. The device X 202 may initiate a multimedia session by sending a session establishment event to the application server 104 (step 1). The device X 202 may perform the establishment event by creating a session description for this media stream and sending the session description in a SIP INVITE method to the application server 104.

Once the application server 104 receives the session establishment event (step 1), the application server 104 may determine whether the session establishment is for an originating session 210 (not shown) or a terminating session 218. The application server 104 may also identify the user associated with the session establishment. The application server 104 may then instantiate a new terminating session 218 (step 2) on behalf of the user, indicating whether originating or terminating service policies should be used within the terminating session 218. The terminating session 218 may process the multimedia stream(s) that are sent by the device X 202 and represented in the session description.

As part of the session instantiation (step 2), the terminating session 218 may populate the service logic 212 for the terminating session 218 (step 3). The service logic 212, as described above, may include the state machine, service profile, and service policies for processing the multimedia session for the user. The terminating session 218 may obtain the service profile for the user from the application server 104. The application server 104, in turn, may obtain the service profile from a local cache, a database, a remote database, or some other accessible storage device or function. The terminating session 218 may populate the appropriate service logic 212 into the terminating session 218 as specified by the service configuration in the service profile for the user.

The terminating session 218 may instantiate a logical endpoint 224, 226, 228 (step 4) or composite endpoint 222 to process the session description included in the session establishment event. The logical endpoint 224, 226, 228 or composite endpoint 222 may include the protocol state machine used to process the session description. The logical endpoint 224, 226, 228 or composite endpoint 222 may provide the interface for the multimedia stream handling and processing the service logic. The composite endpoint 222 may be instantiated in place of a logical endpoint 224, 226, 228 within the terminating session 218, as specified in the user profile when, for example, the user profile indicates that services within the profile need certain capabilities to process or manipulate multiple multimedia streams.

Depending on the user profile, the terminating session 218 may load programmable policies into the policy manager 216 (step 5) and then the composite endpoint 222 may instantiate a logical endpoint 224, 226, 228 for each communication stream (step 6) as specified by the policies derived from the user's profile. Each logical endpoint 224, 226, 228 may manage one or more of the multimedia streams that are defined in the session description. Multiple logical endpoints 224, 226, 228 may manage the same media stream. The composite endpoint 222 may act as a single logical endpoint 224, 226, 228 from the perspective of the service logic 212 and process the media related requests that are driven by the service logic 212 among the multiple logical endpoints 224, 226, 228 as specified via the policies loaded into the policy manager 216.

After the individual logical endpoints 224, 226, 228 within the composite endpoint 222 have been created (step 6), the service logic 212 may complete the processing of the session establishment event (step 7). Once the service logic 212 executes, the service logic 212 may signal to a logical endpoint 224, 226, 228 to process the call and deliver the multimedia streams to the remote device(s) 204, 206, 208. Based on the loaded policies, the composite endpoint 222 may deliver the multimedia streams to zero or more endpoints 224, 226, 228 within the composite endpoint 222. The composite endpoint 222 may individually modify the multimedia streams on a per-endpoint basis based on the programmable policy loaded into the policy manager 216. Each endpoint 224, 226, 228 within the composite endpoint 222 may continue the session establishment to the corresponding remote devices 204, 206, 208 as determined by the policies stored in the policy manager 216.

Figure 5:
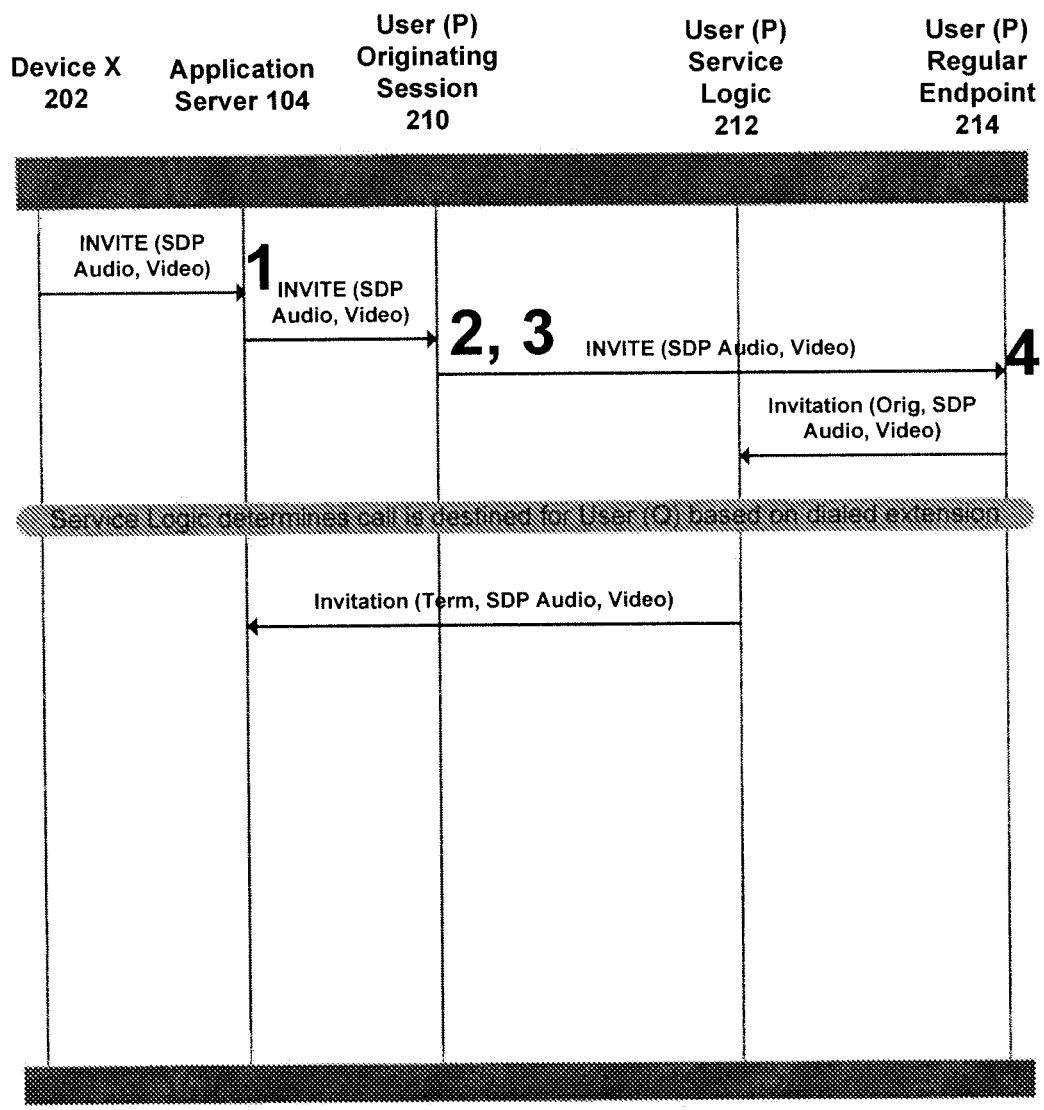
FIG. 5 depicts an originating session of a multimedia service.
Figure 6:
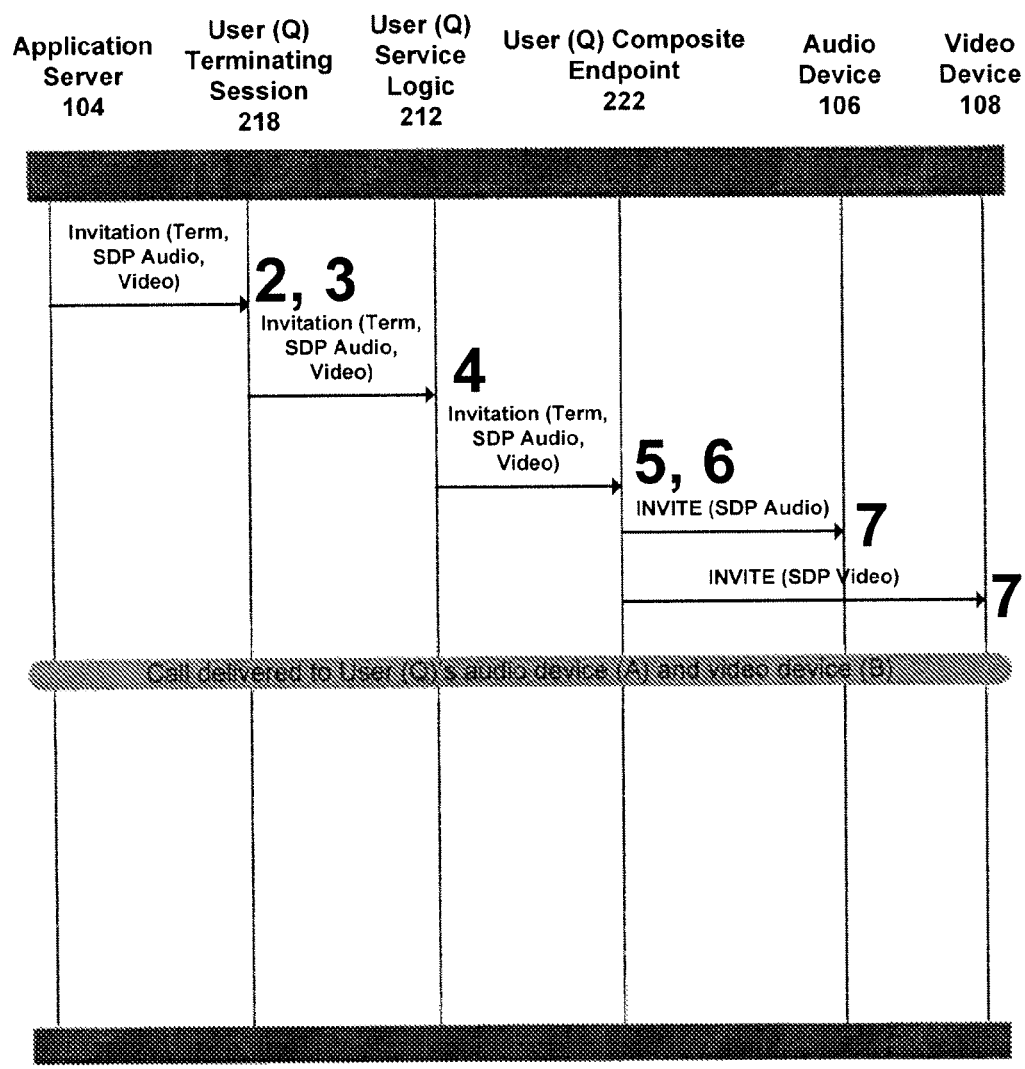
FIG. 6 depicts an exemplary embodiment of a method for providing a terminating session of a video add-on service using an exemplary embodiment of a composite endpoint.

FIGS. 5 and 6 depict an exemplary embodiment of a method for providing a video add-on service 220 using an exemplary embodiment of a composite endpoint 222. The video add-on service 220 may receive audio and video streams within a single session establishment and distribute the audio media stream to one device (e.g., audio device 106 in FIG. 3) and the video media stream to a separate device (e.g., video device 108 in FIG. 2). There are two kinds of sessions, the originating session 210 for user P as shown in FIG. 5 and one the terminating session 218 for user Q as shown in FIG. 6. The steps 1-4 in FIG. 5 correspond to steps 1-4 and step 7 in FIG. 4, and the steps 2-7 in FIG. 6 correspond to the steps 2-7 of FIG. 4.

In step 1 of FIG. 5, user P may place a multimedia audio and video call from an originating device X 202 by, for example, dialing an extension number associated with user Q.

In step 2 of FIG. 5, the application server 104, upon receiving the call from device X 202, may create the originating session 210 for user P.

In step 3 of FIG. 5, the application server 104 may populate the service logic 212 for the originating session 210 with the service profile for user P.

In step 4 of FIG. 5, the application server 104 may create a regular endpoint 214 to encapsulate the protocol state machine for the communication between the application server 104 and device X 202.

The application server 104 may invoke the originating session 210 created for the call from user P. The service logic 212 in the originating session 210 may process the call and determine that the call is destined for user Q by identifying the dialed extension by user P as belonging to user Q. Because the originating session 210 for the originating user P does not need a composite endpoint 222 as determined from the user profile, steps 5 and 6 are not exercised in FIG. 5. Consequently, the regular endpoint 214 may be instantiated within the originating session 210. The service logic 212 may invoke one or more of the application server 104 APIs to instantiate the terminating session 218 for the call to user Q.

In step 2 of FIG. 6, the application server 104 may create the terminating session 218 for user Q to process the multimedia audio and video call from user P, which may be initiated in step 1 of FIG. 5.

In step 3 of FIG. 6, user Q may be subscribed to the video add-on service 220. The application server 104 may populate the service logic 212 for the terminating session 218 with the service profile for user Q.

In step 4 of FIG. 6, the application server 104 may create a composite endpoint 222 to encapsulate the multiple media streams to satisfy the video add-on service 220 processing subscribed to by user Q, as specified in user Q's service profile.

In step 5 of FIG. 6, the composite endpoint 222 acts as the logical endpoint 224, 226, 228 for user Q's terminating session 218 and may be programmed with the appropriate policies to provide the video add-on service 220 on instantiation of the composite endpoint 222. In this case, the policy may be to fork only the audio portion of the call to user Q's audio device 106 and only the video portion of the call to user Q's video device 108, as specified in the service configuration of the service profile for user Q.

In step 6 of FIG. 6, the composite endpoint 222 may create two logical endpoints 224, 226 one for each communication stream to provide the video add-on service within the composite endpoint 222.

In step 7 of FIG. 6, each endpoint 224, 226 may deliver its communication stream to the remote device 106, 108 associated with that endpoint 224, 226. In this case, the endpoint 224 associated with the audio device 106 may send a session establishment event with the audio media stream to the audio device 106 and the endpoint 226 associated with the video device 108 may send a session establishment event with the video media stream to the video device 108.

Exemplary embodiments may be embodied in many different ways as a software component. For example, originating session 210, terminating session 218, service logic 212, video add-on service 220, composite endpoint 222, policy manager 216, and logical endpoints 224, 226, 228 may be embodied as one or more software components. For example, the software component may be a stand-alone software package, a combination of software packages, or it may be a software package incorporated as a "tool" in a larger software product. The software component may be downloadable from a network, for example, a website, as a stand-alone product or as an add-in package for installation in an existing software application. The software component may also be available as a client-server software application, or as a web-enabled software application. The software component may also be embodied as a software package installed on a hardware device. The software component may be embodied on a computer-readable medium. The computer-readable medium may be separate or part of a computer.

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method for providing a plurality of multimedia calls, comprising:
creating one or more terminating sessions at an application server in response to receiving one or more multimedia calls of the plurality of multimedia calls, the plurality of multimedia calls associated with a plurality of originating devices, the plurality of originating devices associated with a plurality of originating users;
instantiating a composite endpoint within the one or more terminating sessions at the application server for communication between the application server and a plurality of terminating devices, the plurality of terminating devices associated with a plurality of receiving users;
instantiating at least two logical endpoints within the one or more terminating sessions at the application server by the composite endpoint for communicating with and respectively associated with at least two terminating devices of the plurality of terminating devices;
emulating a single logical endpoint for the plurality of termination devices by the composite endpoint by aggregating a plurality of communication sessions, the plurality of communication sessions originating from the plurality of originating devices associated with the plurality of originating users and received by the plurality of terminating devices associated with the plurality of receiving users;
concurrently delivering the plurality of multimedia calls from the plurality of originating devices associated with the plurality of originating users to the plurality of terminating devices associated with the plurality of receiving users, the plurality of multimedia calls being delivered through the composite endpoint at the application server, wherein the plurality of multimedia calls appear to originate from the plurality of originating devices associated with the plurality of originating users;
instantiating service logic within the one or more terminating sessions at the application server, wherein the service logic includes a state machine, service profile, and service policies needed to process the plurality of multimedia calls from the plurality of originating devices; and
forking at least two multimedia streams for a multimedia call of the plurality of multimedia calls to at least two terminating devices of the plurality of terminating devices, wherein the forking is performed after the service logic has processed the multimedia call, the forking comprising:
creating, by the composite endpoint, at least two logical endpoints for the at least two terminating devices, the at least two logical endpoints managing the communication of the at least two multimedia streams to the at least two terminating devices,
integrating, by the composite endpoint, a forking service into the application server without introducing any service interactions after the forking service, and
delivering the at least two multimedia streams to the at least two terminating devices.

2. The method of claim 1, wherein the plurality of terminating devices comprise at least a first terminating device and a second terminating device, further comprising:
splitting a multimedia call of the plurality of multimedia calls at the application server into at least a first stream and a second stream using the composite endpoint, the first stream and the second stream being different kinds of session-based media; and
delivering the first stream from the application server to the first terminating device and the second stream from the application server to the second terminating device using logical endpoints associated with the first terminating device and the second terminating device.

3. The method of claim 1, wherein the
service profile is associated with a user from the plurality of originating users.

4. The method of claim 1, wherein the composite endpoint splits an incoming multimedia service of the multimedia call into an audio stream and a video stream and the at least two terminating devices of the plurality of terminating devices comprise a first device for receiving the audio stream of the multimedia service and a second device for receiving the video stream of the multimedia service transmitted from the application server.

5. The method of claim 4, wherein the composite endpoint splits the incoming multimedia service based on one or more policies.

6. The method of claim 1, wherein the composite endpoint provides for a first device to automatically contact a backup device when a primary device is non-responsive or unreachable.

7. The method of claim 1, further comprising:
indicating a plurality of incoming calls from the plurality of originating devices to the plurality of receiving users via the plurality of terminating devices.

8. An application server for providing at least one multimedia service, comprising:
a storage device at the application server holding a plurality of software instructions for a composite endpoint at the application server, the composite endpoint comprising:
forking service logic to fork a plurality of multimedia streams within the composite endpoint at the application server to a plurality of devices, the plurality of devices including:
a plurality of originating devices associated with a plurality of originating users, and
a plurality of receiving devices associated with a plurality of receiving users, wherein the composite endpoint creates a plurality of logical endpoints for the plurality of receiving devices, the composite endpoint implementing a service application programing interface (API) of a single endpoint to integrate a forking service into the application server without introducing any service interactions after the forking service, the forking service logic delivering the plurality of multimedia streams to the plurality of receiving devices;
at least two logical endpoints at the application server and instantiated at the application server by the composite endpoint during a session for communicating with at least two of the plurality of devices;
service logic, performed prior to the forking service, for concurrently delivering a second plurality of multimedia streams between the plurality of originating devices associated with the plurality of originating users and the plurality of terminating devices associated with the plurality of receiving users through the composite endpoint, wherein the second plurality of multimedia streams appear to originate from the plurality of originating devices associated with the plurality of originating users; and
service logic, performed prior to the forking service, for emulating a single endpoint for a plurality of devices by aggregating a plurality of communication sessions from the plurality of devices, the plurality of communication sessions originate from the plurality of originating devices associated with the plurality of originating users, and the plurality of communication sessions are received by the plurality of terminating devices associated with the plurality of receiving users;
a processor at the application server for executing the instructions, the processor being coupled to the storage device; and
a communication interface at the application server coupled to the processor, wherein the composite endpoint provides a single interface to the service logic.

9. The application server of claim 8, wherein the service logic combines at least two multimedia streams.

10. The application server of claim 8, wherein the composite endpoint further comprises a policy manager for providing at least one policy for operation of the at least one multimedia service.

11. The application server of claim 8, wherein the composite endpoint splits an incoming multimedia stream of a multimedia service into an audio portion and a video portion and the at least two devices comprise a first device for receiving only the audio portion of the multimedia service and a second device for receiving only the video portion of the multimedia service.

12. The application server of claim 8, wherein the application server further comprises at least one session for the multimedia service, the session comprising service logic and the composite endpoint.

13. The application server of claim 11, wherein the composite endpoint splits the incoming multimedia service based on one or more policies.

14. The application server of claim 8, wherein the single interface to the service logic provided by the composite endpoint is protocol independent by abstracting protocols from the service logic via an application programming interface.

15. A non-transitory computer-readable medium comprising instructions, which when executed by an application server causes the application server to perform operations for a composite endpoint, the computer-readable medium comprising:
instructions executable by the application server to receive a plurality of multimedia data streams at the composite endpoint at the application server for transmission from the composite endpoint to a plurality of communication devices, the plurality of communication devices including:
a plurality of originating devices associated with a plurality of originating users, and
a plurality of receiving devices associated with a plurality of receiving users;
instructions executable by the application server to have the composite endpoint generate at least two endpoints within the application server during a session for communication with at least two communication devices of the plurality of communications devices, wherein the endpoints specify one of the communications devices for transmission of at least a portion of at least one of the plurality of the multimedia data streams;
instructions executable by the application server to have the composite endpoint concurrently transmit the plurality of multimedia data streams between the plurality of originating devices associated with the plurality of originating users and the plurality of receiving devices associated with the plurality of receiving users, wherein the plurality of multimedia data streams appear to originate from the plurality of originating devices associated with the plurality of originating users;
instructions executable by the application server to have the composite endpoint emulate a single endpoint for the plurality of communication devices by aggregating a plurality of communication sessions from the plurality of communication devices;
instructions executable by the application server to instantiate service logic within the application server, wherein the service logic includes a state machine, service profile, and service policies needed to process the plurality of multimedia calls from the plurality of originating devices; and
instructions executable by the application server to fork at least two multimedia streams of the plurality of multimedia streams to at least two receiving devices of the plurality of receiving devices, wherein the forking is performed after the service logic has processed the multimedia streams, the forking comprising:
instructions to create, by the composite endpoint, at least two logical endpoints for the at least two receiving devices, the at least two logical endpoints managing the communication of the at least two multimedia streams to the at least two receiving devices, instructions to integrate, by the composite endpoint, a forking service into the application server without introducing any service interactions after the forking service, and instructions to deliver the at least two multimedia streams to the at least two receiving devices.

16. The computer-readable medium of claim 15, wherein at least one of the plurality of multimedia data streams comprises at least two of audio data, video data or other data.

17. The computer-readable medium of claim 16, further comprising:

instructions executable by the application server for determining based on a user profile whether two, or all of the audio data, the video, and the other data, and both the audio and video data, is transmitted to one of the endpoints.

18. The computer-readable medium of claim 15, further comprising:

instructions executable by the application server for determining if at least one of the plurality of multimedia data streams needs to be demultiplexed; and if at least one of the plurality of multimedia data streams needs to be demultiplexed, demultiplexing the at least one of the plurality of multimedia data streams.

19. The non-transitory computer-readable medium of claim 15, further comprising instructions executable by the application server for having the composite endpoint split at least one of the plurality of multimedia data streams into an audio stream and a video stream, wherein the at least two communications devices comprise a first device for receiving the audio stream and a second device for receiving the video stream transmitted from the application server.

20. The non-transitory computer-readable medium of claim 19, wherein the composite endpoint splits the at least one of the plurality of multimedia data streams based on one or more policies.

* * * * *